INVENTORS.
P. A. ADAMSON,
BY MERRITT L. MACKNIGHT,
Lester S. Hecht
THEIR ATTORNEY.

DIGITAL-TO-ANALOG CONVERTER

Filed Dec. 31, 1953 3 Sheets-Sheet 2

INVENTORS.
P. A. ADAMSON,
BY MERRITT L. MACKNIGHT,
Lester S. Hecht
THEIR ATTORNEY.

DIGITAL-TO-ANALOG CONVERTER

Filed Dec. 31, 1953 3 Sheets-Sheet 3

INVENTORS.
P. A. ADAMSON,
BY MERRITT L. MACKNIGHT,
Lester S. Hecht
THEIR ATTORNEY.

United States Patent Office 2,916,209

Patented Dec. 8, 1959

2,916,209

DIGITAL-TO-ANALOG CONVERTER

Phil A. Adamson, San Gabriel, and Merritt L. MacKnight, Los Angeles, Calif., assignors, by mesne assignments, to Hughes Aircraft Company, a corporation of Delaware Application December 31, 1953, Serial No. 401,532

26 Claims. (Cl. 235—154)

This invention relates to digital-to-analog converters and, more particularly, to an electronic converter wherein a plurality of applied digital signal sets are converted to corresponding analog output signals, each digital set being first converted to a series of signals, where the number of signals represents the corresponding digital signal set, each analog output signal then being produced as a function of the number of signals in the corresponding series.

Digital-to-analog converters of the general type provided by the present invention are essential components of any system wherein digital signals are utilized to control the operation of various electrical and mechanical devices. In a particular situation, for example, the converter of the present invention may be utilized in combination with a digital computer for translating the digital output signals produced by the computer into analog signals which may be utilized to control such analog devices as synchros, servos, and the like.

Several types of electronic digital-to-analog converters have been utilized in prior art systems. In one type of converter the entire range of digital signal sets and corresponding analog equivalents are continuously produced and compared with the digital signal set to be converted. When the digital signal set is found which corresponds to the set to be converted, the corresponding analog signal is gated to an output circuit for utilization. A system of this general type is described in U.S. Patent No. 2,533,242, entitled "Data Transformation System" by D. H. Gridley, issued December 12, 1950.

While the Gridley system may be adapted to convert a plurality of applied digital signal sets to corresponding analog signals, on a time-sharing basis; it is apparent that the speed of operation is greatly limited since it is necessary to compare the entire range of digital signal sets with each digital set to be converted. In addition, the Gridley system necessitates the provision of a coded record of the range of the digital signal sets and the corresponding analog signal; the coded record being in the form of a perforated disc. It will be apparent from the discussion which follows that the coded record is unnecessary in other types of digital-to-analog conversion systems, and that the requirement of the coded record unnecessarily complicates the converter and further limits its speed of operation.

Another disadvantage of the Gridley system is that the analog output signal produced thereby is a voltage-level signal which must be continuously generated by means of electronic circuits. As a result an interruption in the operation of the circuit may result in a complete loss of the analog signal.

In another type of digital-to-analog converter the number to be converted is initially entered into a register comprising a plurality of flip-flops, one for each digit of the number. The flip-flops are utilized to control a decoding network which produces an analog output signal corresponding to the setting of the register. One system of this type is described in an article entitled "Continuous Variable Input and Output Devices" by J. P.

Eckert, Jr. in vol. III of "Theory and Techniques for Design of Electronic Digital Computers," June 30, 1948, on pages 33–11 to 33–13 and Figure 7.

In the system described in the article by J. P. Eckert the flip-flops of the register are utilized to switch a corresponding plurality of constant current sources into an attenuator network, one flip-flop controlling each corresponding source. The attenuator network weights the current sources in accordance with the code established for setting the flip-flops and a linear summation of currents results which, acting across the output impedance of the network, produces an output signal which is the analog equivalent of the register setting. An improved system of this general type, but which utilizes constant voltage sources, rather than constant current sources is described and claimed in copending U.S. patent application, Serial No. 239,077, entitled "Digital-to-Analog Converter" by Siegfried Hansen, filed July 28, 1951, now Patent No. 2,718,634. In addition, another type of current-weighting converter is described in U.S. Patent No. 2,610,295, entitled "Pulse Code Modulation Communication System" by R. L. Carbrey, issued September 9, 1952.

The current and voltage weighting converter systems of the above-described type have the same limitations as the Gridley system with respect to the nature of the output signal. An interruption of either voltage or current supply results in a total loss of the analog information. In addition, this type of system is limited in accuracy due to the fact that a constant current or constant voltage source is required for each digit in the number to be converted.

Another disadvantage common to the above-mentioned types of systems wherein a transitory electronic memory is utilized and must be continuously regenerated is that rather complicated electronic switching is required for making entries into particular analog memory positions.

The present invention discloses an electronic converter which overcomes the above and other disadvantages of prior art converters. According to the present invention the set of digital input signals to be converted are first translated into a series of signals where the number of signals represents the analog equivalent of the input set. The series of signals may be conveniently located in a memory location which is insensitive to power supply failures with the result that a permanent analog memory is available.

Each series of signals representing a digital input set is then translated into the corresponding analog output signal in a circuit which senses the number of signals and produces a signal having a level representing the number. One manner of achieving this translation is to circulate each series of signals during a period corresponding to the time of application of a number of signals representing the maximum digital number which may be converted. The series of signals which are circulated are then converted into a continuous voltage-level signal having a high level in response to the application of the signals and having a low level after the termination of the series. The voltage-level signal, therefore, is a square wave signal having a period equal to the period of circulation and having an average value which corresponds to the analog equivalent of the digital input signals. This average value may be translated into an analog output signal by means of a low-pass filter circuit which effectively produces the direct-current component of the square-wave signal.

In its general structural form the present invention comprises a counter for receiving the number or complement of the number to be converted. The conversion operation is initiated by actuating the counter to count up or down, depending upon whether the complement of the number or the number itself has been entered therein, the application of count pulses to the counter being controlled through a count control circuit. The state of the counter is continuously translated into a voltage-level signal having one level for the maximum or minimum count of the counter, depending upon whether the complement of the number or the number has been entered, and a second level for all other counts. This voltage-level signal is utilized to control the operation of the count control circuit so that count pulses are applied to the counter until it reaches its maximum or minimum count.

The count control circuit also produces a voltage-level signal indicating the period of application of pulses to the counter. This signal has a high level during a time interval corresponding to a number of pulses applied to the counter and is utilized to control the entry of the series of signals representing the number into a serial memory. Where a pulse type memory is utilized it is possible to enter pulses directly corresponding to count pulses into the memory.

Each analog output signal is stored as a corresponding series of signals in a separate memory having a digit capacity of $2^n-1$ digits where $n$ is the number of digits in the number to be converted. The series of signals are translated into the continuous voltage level signal by setting a flip-flop to a 1-representing state in response to the first signal of the series and by resetting the flip-flop to a 0-representing state after the last signal of the series. Each flip-flop, then, may be utilized directly to control the operation of an associated low-pass filter circuit which produces the corresponding analog output signal.

Where it is desired to obtain conversions which are accurate to within one part out of $2^n-1$ parts, each flip-flop is utilized to control an electronic switch through which a signal of known current or voltage amplitude is passed to a low-pass filter circuit. It is thus possible to achieve extremely accurate conversions by means of a single constant voltage or constant current source, whereas the above-mentioned prior art circuits would require a constant current or constant voltage source for each digit of the number to be converted.

Where a high degree of accuracy is not required, and the analog output signals are derived directly from the flip-flop signals, several analog equivalent signal series may be entered into the same serial memory. This operation is achieved by effectively multiplexing the entry of the signal series into the corresponding memory through an input matrix. The memory signal series is then translated into separate signal series representing respective analog signals, through an output matrix.

The continuous analog memory feature of the invention may be achieved by utilizing magnetic drum circulating registers to provide the serial memory sections. The series of signals then are recorded as a corresponding series of flux recordings, the flux recordings being effectively circulated by continuously rotating the drum past a reading head. It should be apparent that this type of recording provides a permanent record of a signal series representing an analog signal.

Accordingly it is an object of the present invention to provide an electronic converter for converting an applied digital set into a corresponding analog output signal wherein the analog output signal may be permanently stored in a memory which is insensitive to power supply failures.

Another object is to provide a digital-to-analog converter wherein accurate conversions may be performed with only a single constant current or constant voltage source for each analog signal.

A further object is to provide an electronic converter for translating a plurality of applied digital signal sets into corresponding analog output signals, each analog output signal being produced by first forming a series of signals, where the number of the signals in the series represents the analog output signal.

Still another object is to provide a digital-to-analog converter wherein a permanent recording of the analog output signals may be achieved without the necessity of complicated electronic gating circuits.

Yet a further object is to provide a digital-to-analog converter wherein the digital number to be converted is first translated into a series of signals, the number of signals representing the corresponding digital number, each analog output signal then being produced as a function of the number of signals in the series.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a block diagram of the basic embodiment of the present invention;

Figs. 2*a*, 2*b*, and 2*c* are composite diagrams of the waveforms of signals appearing at various points in the embodiment of Fig. 1;

Figure 1:
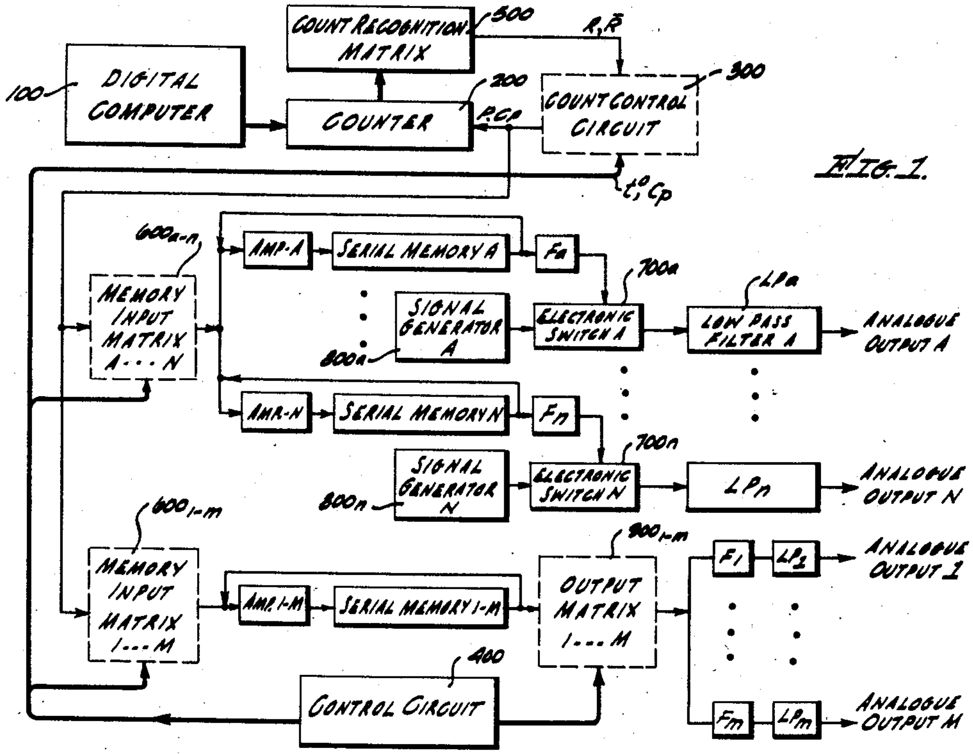

Reference is now made to Fig. 1 wherein there is shown one embodiment of a digital-to-analog converter according to the present invention wherein digital signal sets produced by a computer 100 are converted to corresponding analog output signals. As illustrated in Fig. 1, the signals produced by computer 100 are applied to a counter 200, which also receives count pulses through a count control circuit 300 which is controlled by signals produced by a control circuit 400 and a count recognition matrix 500. Count recognition matrix 500 produces an output signal R having a 1-representing level during a predetermined count of counter 200. As an illustration it will be assumed hereafter that this count occurs when all of the counter signals are 1-representing signals, and that the digital signal sets are entered into the counter as complements of the corresponding numbers. Counter 200 then is actuated to count up from a state representing the complement of the number to a state of $n$ 1's where $n$ represents the number of binary places of the counter.

Count control circuit 300 produces an output signal P having a 1-representing level indicating the period during which count pulses are applied to counter 200. Signal P is applied to a memory input matrix $\mathbf{600}_{a-n}$ which controls the entry of signal series representing corresponding analog output signals into serial memory sections A . . . N, where the notation A . . . N is utilized to indicate that any number, N, of memory sections may be utilized. Signal P is also applied to an input memory matrix $\mathbf{600}_{1-m}$ through which signals are entered into a memory section 1 . . . M, where the notation 1 . . . M is utilized to indicate that any number of signal series may be entered therein by multiplexing. Since each memory section has a $2^{n-1}$ digit length, the number of signals entered into memory 1 . . . M, for each series, is reduced by an amount M times X, where M represents the number of series which are multiplexed into the memory, and X represents a buffer factor providing spaces between signals of different series.

The signals produced by input matrices 600 are entered into corresponding memory sections through corresponding amplification stages Amp.–A . . . Amp.–N, and Amp. 1–M. The output signals of the memory sections are then recirculated through the corresponding amplification stage. The signal series produced by memory sections A . . . N are translated into corresponding voltage-level signals through flip-flops F*a* . . . F*n*, respectively. The signals produced by these flip-flops are square-wave signals having a period of $2^{n-1}$ digit time intervals and having an average value corresponding to the analog equivalent of the digital number which had previously been entered into counter 200. Thus, each flip-flop produces a high-level signal during a time interval corresponding to the time during which pulses are applied to counter 200 and count control signal P is a 1-representing signal.

Flip-flops F*a* . . . F*n* are coupled to electronic switches **700*a* . . . 700*n***, respectively, and control the passage of a predetermined signal produced by an associated signal generator A . . . N to an associated low pass filter circuit LP*a* . . . LP*n*. Each low pass filter circuit produces an output signal having a level corresponding to the time of duration of the 1-representing portion of signal P during the entry of the corresponding digital number into counter 200. Since the low pass filter circuits can be designed to accurately produce a signal corresponding to the average of the square-wave signal produced by the associated flip-flop the anolog output signal produced thereby is accurate to one part out of $2^n-1$ parts.

A simpler, but less accurate, conversion is achieved through serial memory section 1 . . . M. The accuracy in this case is reduced by the amount M times X since the number of signals in the series has been reduced by a corresponding amount. Thus, in this situation the square-wave signals produced by corresponding flip-flops F*l* . . . F*m* are directly converted through associated filter circuits LP*l* . . . LP*m* to the corresponding analog output signals.

Suitable structure for counter 200, and the serial memory sections is not described in detail herein since these circuits are now well known in the computing art. A suitable counter, for example, may be a binary counter such as that shown on page 15 of "High-Speed Computing Devices" by Engineering Reseach Associates, published in 1950 by McGraw-Hill Book Company, Inc.; or an improved high-speed counter of the type described and claimed in copending U.S. patent application Serial No. 245,860 for "High-Speed Flip-Flop Counter," by Eldred C. Nelson, filed September 10, 1951. The serial memory sections may be delay lines such as are described in an article entitled "Mercury Delay Line Memory Using Pulse Rate of Several Megacycles" by I. L. Auerback, in vol. 37 of Institute of Radio Engineers Proceedings, August 1949, on pages 855–861; or in U.S. patent application Serial No. 300,286, entitled "Passive Element Signal Stepping Device" by Daniel L. Curtis, filed July 22, 1952, now Patent No. 2,847,159. In a magnetic drum computer, however, it is preferable to utilize drum channels as circulating registers, since such circulating registers are readily synchronized with the computer operation. It is not considered necessary to incorporate references indicating suitable flip-flops, low-pass filters, or amplifiers since these circuits are now standard electronic equipment.

Figure 2A:
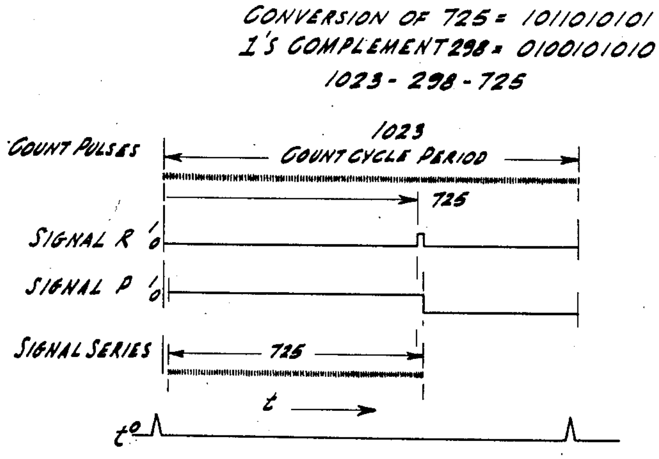
Figure 2B:
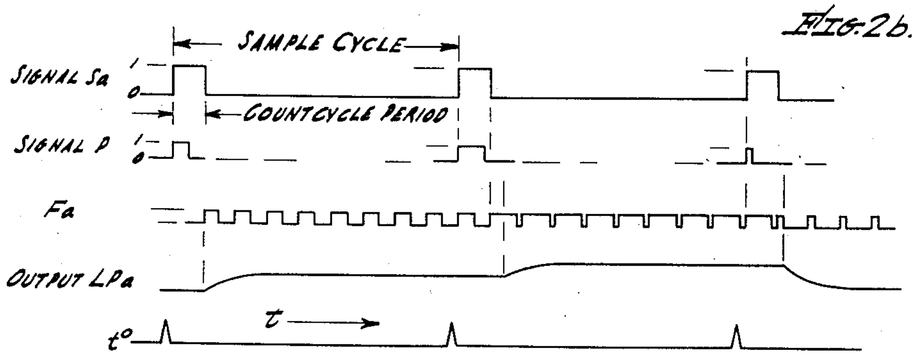
Figure 2C:
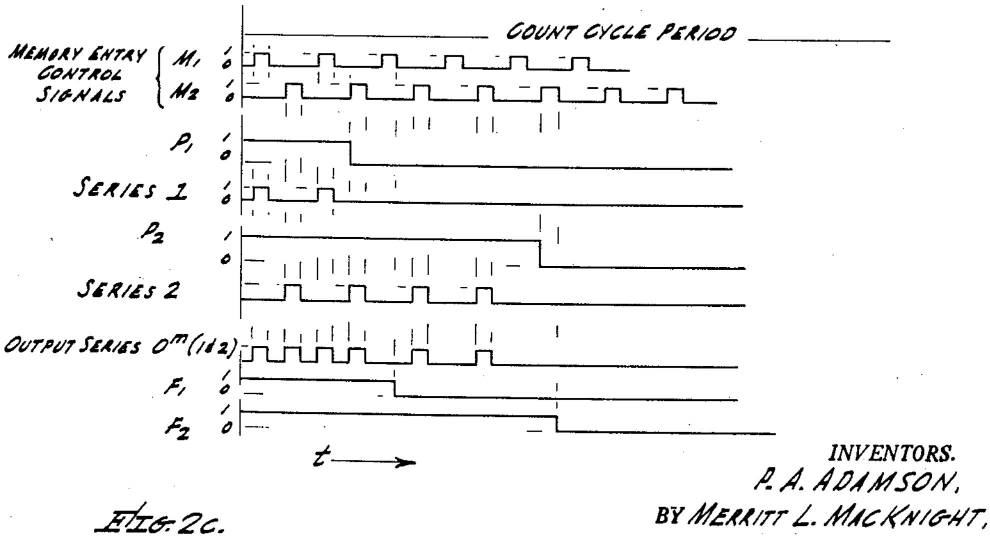

Before considering the specific circuits shown in Figs. 3 through 9 it is helpful in understanding the invention to consider an illustrative set of operations as depicted in the waveforms of Figs. 2*a*, 2*b*, and 2*c*. Consider first the operation illustrated in Fig. 2*a* wherein a binary number 1011010101 representing the decimal number 725 is to be converted to an equivalent analog signal, the binary number having successive higher places to the left having weights of 1, 2, 4, 8, 16, 32, 64, 128, 256, and 512. At the outset of the operation the binary 1's complement 0100101010 is entered into counter 200, and may be considered to represent the decimal number 298.

At the beginning of the conversion operation, then, signal P produced by count control circuit 300 is a 1-representing signal, indicating that count pulses are to be applied to counter 200. Signal R, produced by count recognition matrix 500, is a 0-representing signal since the initial count is not 1111111111 or 1023. Counter 200 continues to count up in response to pulses applied through count control circuit 300 until signal R becomes 1, indicating a count of 1111111111 and the application of 725 pulses to the counter. The next count pulse resets the counter to 0000000000 and signal R becomes 0. Signal P, indicating the period of pulse application to the counter, remains 1 for an additional pulse interval so that its duration covers 725 pulse intervals, 726 pulses having actually been applied to the counter. During the 1-representing level of signal P a series of 725 signals is entered into one of the serial memory sections.

The manner in which each signal series is converted into an analog output signal is illustrated in Figs. 2*b* and 2*c*. Fig. 2*b* specifically illustrates the translation of a signal series in memory section A to the analog output signal produced by low-pass filter LP*a*. As indicated in Fig. 2*b*, signal series corresponding to numbers to be converted are entered into serial memory A when control signal S*a*, produced by control circuit 400, has a 1-representing level. Signal S*a*, it will be noted, assumes a 1-representing level during an interval which is at least as long as the count-cycle period, once during each sample cycle; the sample period being determined by the number of conversions which are to be performed through counter 200, and the time required to enter numbers into counter 200. Each time signal S*a* has a 1-representing level, then, a signal series representing the number in counter 200 is entered into serial memory section A, the number of signals being indicated by the 1-representing signal level duration of signal P.

The series of signals in memory section A are then converted to a corresponding square-wave signal through flip-flop F*a*, where waveform F*a* in Fig. 2*b* illustrates the shape of the signal during a particular series of conversions. The signal produced by signal F*a* is delayed with respect to the initial entry of the corresponding signal series into memory section A by a time interval corresponding to the delay between the entering of signals into memory section A and the reading of corresponding signals. While this delay is shown as a complete count cycle, it should be understood that where a magnetic drum circulating register is utilized the delay may be much smaller or even zero.

In the illustrative operation assumed for the purpose of Fig. 2*b* the first number to be converted is 512, the second number 1000, and the third number 200. Thus, signal P, during the entry of the first series of signals has a duration representing the number 512 and signal F*a* produced by flip-flop F*a* then becomes a square-wave signal with a period of 1023 pulse intervals, with a high-level duration of 512 pulse intervals. Signal F*a* continues in this waveform until the next entry of a signal series corresponding to the second number (1000) after which time signal F*a* has a high-level portion for a time interval representing the number 1000. Finally, after the third signal series is entered into memory section A signal F*a* has a period of high-level duration representing the number 200.

The square-wave signal F*a* is utilized to control electronic switch **700*a* through which an accurately regulated signal produced by generator 800*a*** is passed to filter LP*a*. Filter LP*a* is designed so that it produces a signal having a level corresponding to the direct-current component of the signal passed through switch 700*a*. As indicated in Fig. 2*b*, however, the filter does not respond instantaneously but rather assumes a level representing the analog equivalent of the corresponding input number, after a delay corresponding to the time constant of the filter. It is not considered necessary to specify a particular time constant since this may vary with the particular application and is of no consequence with respect to the present invention. It is noted in Fig. 2*b*, then, that the output signal LP*a* assumes a level representing the number 512 after several count-cycle periods, then a level representing the number 1000, and finally the number 200.

Where an accuracy of one part out of $2^n-1$ parts is not required such as may be achieved through a separate serial memory section, a signal generator, and electronic switch combination; the output flip-flops may be directly coupled to an associated low-pass filter such as in the situation shown in Fig. 1 where flip-flops F1 . . . F*m* are coupled to control filters LP1 . . . LP*m*, respectively. In this situation it is possible to achieve a further economy in circuits by multiplexing the series representing analog signals into a single serial memory. The manner in which this operation may be performed is illustrated in Fig. 2*c* where it is assumed, for purposes of a simple example, that two series are to be entered into the same memory section. Referring now to Fig. 2*c* it is noted that two series of memory control signals $M_1$ and $M_2$ are produced by control circuit 400, each series having a plurality of 1-representing levels during pulse intervals when the corresponding series is to be entered into the memory section. In the example described in Fig. 2*c*, series $M_1$ has 1-representing levels during pulse intervals 1, 5, 9 . . . etc., and series $M_2$ has a 1-representing level during pulse intervals 3, 7, 11 . . . etc. It should be noted that pulse intervals 2, 4, . . . etc. are not utilized so as to provide a buffer space in the memory section between the signals of series $M_1$ and $M_2$.

The conversions of two different numbers may then be entered into the memory section; the corresponding count control signals P being designated as $P_1$ and $P_2$, respectively, only part of signals P being shown. During the time that signal $P_1$ and series $M_1$ have 1-representing values a first series is entered into the memory section and during the time interval that signal $P_2$ and series $M_2$ have 1-representing levels a second series is entered into the memory section. The output series produced by the memory section is then a composite waveform including both first and second signal series.

The composite signal series is then translated back into separate signal series controlling flip-flops F1 and F2 (where M is equal to 2) through output matrix $\mathbf{900}_{1-m}$ shown in Fig. 1. Matrix $\mathbf{900}_{1-m}$ is operative to set flip-flop F1 to 1 in response to the first signal of the first series and then to reset flip-flop F1 to 0 after the simultaneous occurrence of the 1-representing level of control signal $M_1$ and a 0 in the first series.

In a similar manner matrix $\mathbf{900}_{1-m}$ produces a signal setting flip-flop F2 to 1 at the beginning of the second series and rests flip-flop F2 to 0 upon the first simultaneous occurrence of a 1-representing level of control signal $M_2$ and a 0 signal in the second series. It will be noted that waveforms F1 and F2 do not accurately represent the corresponding signals $P_1$ and $P_2$ which indicate the corresponding periods of application of count pulses to the counter. This results because of the number of signals in the corresponding series has been reduced by the factor M times X discussed above. In the particular example considered, M is equal to 2 and X is equal to 2 since effectively two buffer spaces are provided to separate the signals of the composite series. Thus, the accuracy of the conversion is reduced from approximately .1% (approximately 1 part out of 1000) to approximately .4%.

Although the invention is not limited to particular circuits which may be utilized in count control circuits 300, control circuit 400, count recognition matrix 500, matrices 600, electronic switches 700, signal generators 800, and output matrix 900 it is considered that the invention will be better understood after at least one suitable form of each of these circuits has been described. Consider first a suitable form for count control circuit 300 illustrated in Fig. 3.

Figure 3:
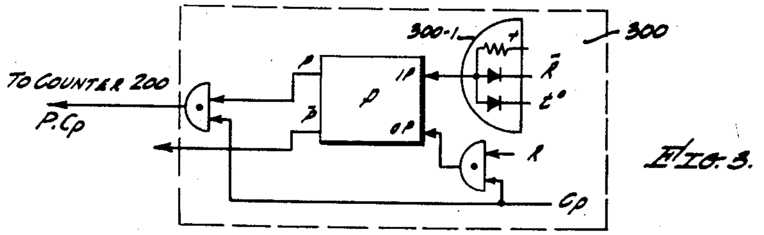
Fig. 3 is a schematic diagram of one form of count control circuit 300 of Fig. 1.

Referring now to Fig. 3, it is noted that count control circuit 300 includes a flip-flop P having 1 and 0 input circuits 1P and 0P and producing output signals P and $\bar{P}$. Flip-flop P is a conventional flip-flop which is set to 1 and 0 in response to signals applied to input circuits 1P and 0P, respectively. Output signals P and $\bar{P}$ have 1 and 0 representing states respectively when flip-flop P is in a 1-representing state. Since signal P is to assume a 1-representing level at the beginning of each conversion period only if the count recognition signal R is 0 (the signal $\bar{R}$ its complement being 1) a signal is applied to input circuit 1P of flip-flop P only when signal $\bar{R}$ is equal to 1. This operation may be expressed logically as an "and" function as follows:

$$1P=t^0.\bar{R}$$

where the dot (.) represents the logical "and" and signal $t^0$ is a timing signal produced by control circuit 400, and occurs at the end of each sample cycle, as shown in Fig. 2*b*.

A signal corresponding to this "and" function is produced by an "and" circuit 300–1 shown in Fig. 3. "And" circuit 300–1 receives signals $t^0$ and $\bar{R}$ applied to separate input terminals and produces a 1-representing output signal when both input signals are 1-representing signals. It is not considered necessary to describe the "and" and "or" circuits which may be utilized in mechanizing certain circuits of the present invention since such circuits are well known in the computing art. Suitable circuits, for example, are described on pages 37 to 45 of "High-Speed Computing Devices" by Engineering Research Associates, published in 1950 by McGraw-Hill Book Company, Inc., New York and London, and on pages 511 through 514 of an article entitled "Diode Coincidence and Mixing Circuits in Digital Computers" by Tung Chang Chen, in the Proceedings of the Institute of Radio Engineers, volume 38, May 1950.

Flip-flop P is then reset to 0 when counter 200 assumes a state wherein all digits are 1 and signal R becomes equal to 1. This operation is defined by the function 0P as follows:

$$0P=R.Cp$$

where signal C*p* represents a series of clock pulses produced by control circuit 400. In operation, then, flip-flop P is set to 1 by signal $t^0$ if the input digital number to be converted is not equal to 0 and is then reset to 0 when the counter reaches its maximum count.

Figure 4:
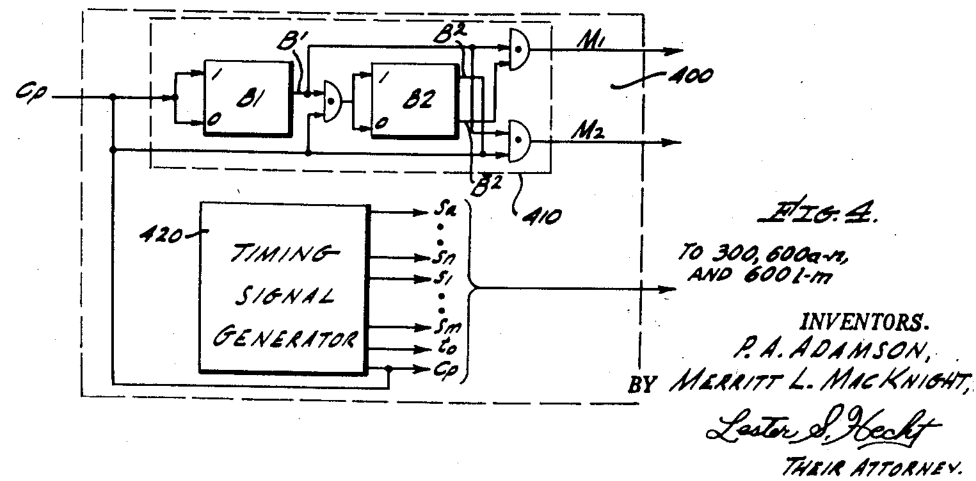
Fig. 4 is a schematic diagram of one form of control circuit 400 of Fig. 1.

The general form of control circuit 400 is illustrated in Fig. 4. As indicated in Fig. 4, the control series $M_1$ and $M_2$ are derived in a binary counter 410 including flip-flops B1 and B2 producing complementary output signals $B^1$, $\bar{B}^1$; $B^2$, $\bar{B}^2$, respectively. It is assumed, for purposes of illustration, that the count sequence appears as follows:

| $B^2$ | $B^1$ |
|---|---|
| 0 | 0 |
| 0 | 1 |
| 1 | 0 |
| 1 | 1 |

Signal series $M_1$ and $M_2$, then, may be defined as follows:

$$M_1=\bar{B}^2.B^1$$
$$M_2=B^2.B^1$$

Counter 410 is reset to the state 00 prior to each operation so that signal series $M_1$ assumes a high-level signal after counts 1, 5, 9, . . . etc. In a similar manner, signal series $M_2$ assumes a high-level signal after counts 3, 7, 11, . . . etc. This operation provides the series shown in Fig. 2*c*. The other timing signals produced by control circuit 400 such as signals *Sa* through *Sn*, *Sl* through *Sm* (controlling matrix $600_{1-m}$), $t^0$, and *Cp* are produced by a signal generator 420 which is not illustrated in detail since such circuits are well known. Signal generator 420, for example, may comprise a series of signals recorded on a magnetic drum and appropriate amplification stages.

The signals R and $\bar{R}$ required in controlling the operation of flip-flop P may be produced in count recognition matrix 500 as "and" and "or" circuits respectively defined as follows:

$$(500r) \quad R=C1.C^2 \ldots C^n$$
$$(500\bar{r}) \quad R=C^1.C^2 \ldots C_n$$

where signals $C^1 \ldots C^n$ have 1-representing values when corresponding flip-flops in counter 200 are in a 1 state, and signals $\bar{C}^1 \ldots \bar{C}^n$ have 1-representing values when the corresponding counter flip-flops are in a 0 state.

Figures 5, 6, 7:
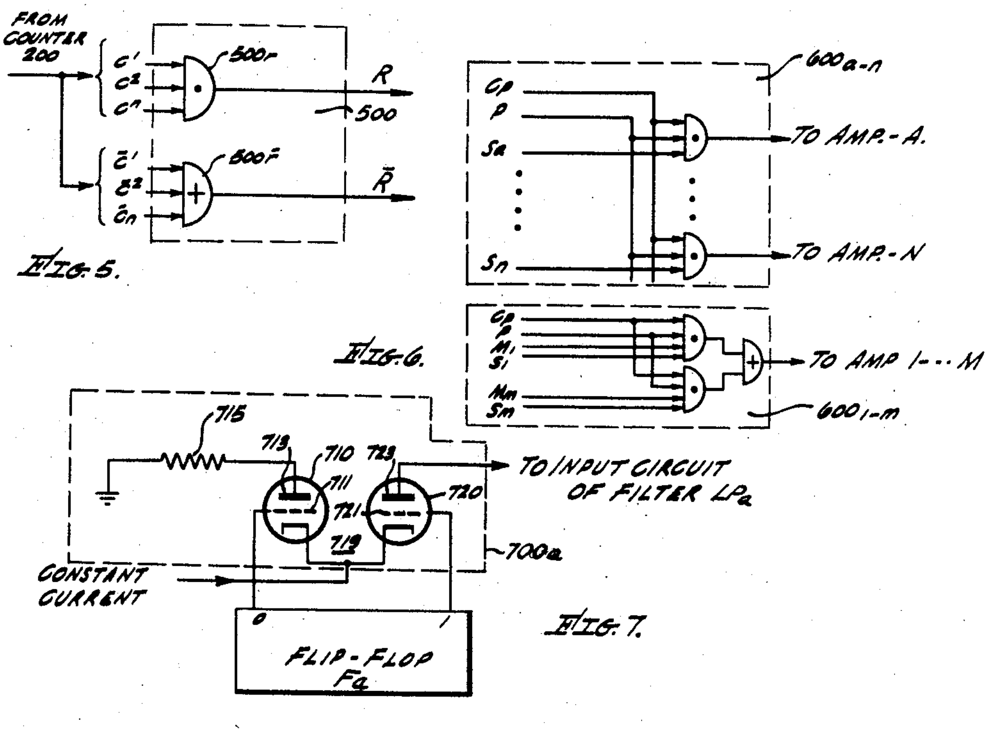
Fig. 5 illustrates a suitable form of count recognition matrix 500 of Fig. 1.
Fig. 6 illustrates a suitable form for matrices 600 of Fig. 1.
Fig. 7 illustrates a suitable form for electronic switches 700 of Fig. 1.
Figure 9:
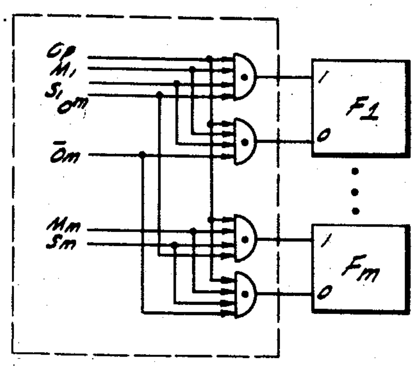
Fig. 9 illustrates a suitable form for output matrix $\mathbf{900}_{1-m}$ of Fig. 1.

Mechanizations suitable for matrices 600 and matrix 900 are illustrated in Figs. 6 and 9, respectively. Matrix $600_{a-n}$ of Fig. 6 is mechanized to apply signals to amplifiers Amp.–A . . . Amp.–N according to the following logical functions:

$$(600_{a-n}) \quad \begin{array}{l} \text{to Amp.–A} = Sa.P.Cp \\ \vdots \\ \text{to Amp.–N} = Sn.P.Cp \end{array}$$

These functions define a simple "and" gating function where a series of pulses are applied to corresponding amplifiers during a corresponding one of the sample periods *Sa* . . . *Sn*, when signal P has a 1-representing level.

In a similar fashion "and" gating functions may be defined for the multiplexing function of matrix $600_{1-m}$ as follows:

$$(600_{1-m}) \text{ to Amp.–1} \ldots M=M_1.S1.P.Cp+ \ldots M_m.Sm.P.Cp$$

This function indicates that a signal series is applied to amplifier 1 . . . M during each sample period (such as sampling period S1) when the corresponding multiplexing series (such as $M_1$) has a 1-representing level, during the time that signal P has a 1-representing level.

After the signal series have been entered into memory section 1 . . . M the output signal series $0^m$ produced by the memory section represents a composite series including all series previously entered. Series $0^m$ is then translated through matrix $900_{1-m}$ into separate signal series applied to flip-flops F1 . . . F*m*, respectively. This switching function may be defined as follows:

$$(900_{1-m}) \quad \begin{array}{l} 1F1=M_1.S1.0^m.Cp \\ 0F1=M_1.S1.\bar{0}^m.Cp \\ \vdots \\ 1Fm=M_m.Sm.0^m.Cp \\ 0Fm=M_m.Sm.\bar{0}^m.Cp \end{array}$$

where signals $0^m$ and $\bar{0}^m$ are 1 and 0 representing output signals of memory section 1 . . . M. According to these functions each flip-flop is set to 1 during the corresponding sampling period at the beginning of the corresponding series when signal $0^m$ is equal to 1 and a count pulse *Cp* is applied, and is then reset to 0 upon the first coincidence of the 1-representing level of the corresponding control signal M and the 1-representing level of signal $\bar{0}^m$.

A suitable form of electronic switching circuit 700 for providing a constant current input signal for an associated low-pass filter circuit is shown in Fig. 7. As indicated in Fig. 7, switch 700 includes first and second electron discharge tubes 710 and 720. The grid 711 of tube 710 is coupled to the 0-state-indicating output circuit of the controlling flip-flop (such as flip-flop F*a*) and the grid of tube 720 is coupled to the 1-state-indicating output circuit of the controlling flip-flop. The anode output circuit 723 of tube 720 is coupled to the input circuit of the filter to be controlled and the anode output circuit 713 of tube 710 is coupled to a load resistor 715. The constant current input signal is applied to the common cathode input circuit 719 of tubes 710 and 720.

Load resistor 715 has an impedance which is selected to match that of the filter circuit so that the load impedance of the constant current source is the same for both states of the controlling flip-flop. When the controlling flip-flop is in a 1-representing state tube 720 is biased so that it is in a conducting state and provides a low impedance path for current from the constant current generator to the associated filter input circuit. Whereas, when the controlling flip-flop is in a 0-representing state, tube 720 is biased so that it is in a nonconducting state and tube 710 is in a conducting state so that the constant current source is effectively switched to load impedance 715. Thus, an accurately regulated signal is applied to the associated filter when the controlling flip-flop is in a 1-representing state.

Figure 8:
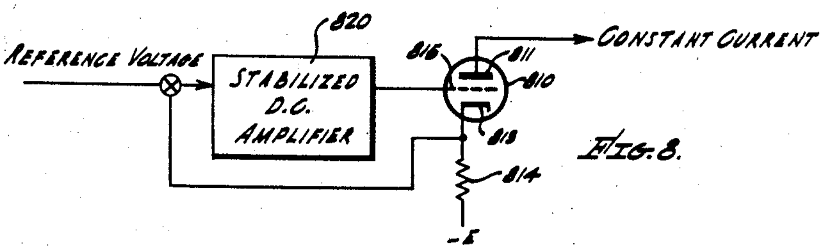
Fig. 8 illustrates a suitable form for signal generators 800 of Fig. 1.

The general form of a constant current source suitable for providing the signal applied to switches 700 is illustrated in Fig. 8. As indicated in Fig. 8 the constant current source 800 includes a vacuum tube 810 having its anode output circuit 811 coupled to the cathode input circuit of an associated electronic switch, and its cathode 813 coupled through a cathode load resistor 814 to a source of negative potential, not shown. The impedance of tube 810, and consequently the amount of current which passes therethrough for a predetermined voltage difference across the tube, is controlled by the signal produced by a stabilized direct-current amplifier 820 coupled to grid 815 of tube 810. Since direct-current amplifier 820 may be of a conventional design it is not considered necessary to show it in detail herein. The signal which appears across cathode load resistor 814 represents the current which passes through tube 810 and is subtracted from a reference voltage having a known amplitude. The difference signal is amplified in amplifier 820 and is utilized to control the impedance of tube 810, resulting in a stabilized operating point where the voltage across resistor 814 is equal to the reference voltage. This provides a constant current output signal which has an amplitude determined by the amplitude of the reference voltage and the value of load resistor 814.

Other forms of electronic switching circuits which are suitable are described in "Electronics Experimental Techniques" by William C. Elmore and Matthew Sands, published in 1949 by McGraw-Hill Book Company, Inc., the particular switching circuit of Fig. 7 being shown on page 53. Other suitable types of regulated signal generators are described on pages 555 through 570 of the M. I. T. Radiation Series, Electronic Instruments, volume 21, section 16.7, published in 1948 by McGraw-Hill Book Company, Inc.

From the foregoing discussion it is apparent that the present invention provides an electronic converter which may be utilized to convert a plurality of applied digital signal sets into corresponding analog output signals, wherein each analog output signal may be permanently stored as a corresponding series of signals in a memory which is insensitive to power supply failures. The invention provides a class of converting circuits wherein only a single constant current or constant voltage source is required for each accurate analog output signal and no constant current or constant voltage sources are required where a high degree of conversion accuracy is not desired.

Although the invention has been described in particularity with reference to a system where both accurate and inaccurate conversions are performed, it will be understood that separate subcombinations of converters having relatively high and low accuracies are contemplated as well. Thus, the converter may include only separate memory sections for each conversion, where an accuracy of one out of $2^n-1$ parts is possible or the converter may include only a single memory section for all conversions where the corresponding signal series are multiplexed into the memory section, the accuracy thereby being reduced by the above-mentioned factor M times X.

Where a filter is utilized to form a signal having an amplitude equal to the average value of the square-wave signal representing a signal series it is necessary to recirculate the signal series in the corresponding memory section. However, other translation means are available where the average value of a square-wave signal may be derived during one period and in this situation it is not necessary to recirculate the signal series. Consequently, a serial memory device may not be required.

While the general form of the various circuit components has been described it will be understood that a multitude of variations are possible. For example, counter 200 need not be a binary counter but could be a binary-coded decimal counter wherein four binary counting stages are associated with each decimal digit. In this situation the complement which is initially entered into the counter would be the 9's complement rather than the 1's complement as described.

The particular form of the matrices described has been selected for simplicity rather than to point out a particular practical application of the invention. It will be understood that in an actual converting system utilizing the present invention the matrix functions may be considerably more complicated and many other timing and control signals may be introduced.

What is claimed as new is:

1. An electronic circuit for converting an applied set of digital signals into a corresponding analog output signal, said circuit comprising: first means for receiving the applied set of signals and producing a series of signals, the number of signals in said series representing the digital signal set; second means responsive to said series of signals for producing a square-wave signal having a period corresponding to the time of application of the number of signals representing the maximum digital signal set which may be converted, said second means including means responsive to the first signal in said series for changing said square-wave signal from a first level to a second level, and means responsive to the last signal in said series for changing said square-wave signal from said second level to said first level; and third means responsive to said square-wave signal for producing an output signal having an amplitude representing the duration of the first level in the square-wave signal during said period, said output signal constituting the analog output signal.

2. The circuit defined in claim 1 wherein said first means includes a counter for receiving signals representing the complement of the set of digital signals, a gating circuit for producing a signal R having a 1-representing level when said counter is in a maximum count state, and a control circuit responsive to signal $\bar{R}$ complementary to signal R for actuating said counter to count up to said maximum count state, said control circuit thereby producing said series of signals.

3. The circuit defined in claim 1 wherein said second means includes a serial memory for receiving said series of signals, said series of signals being recirculated in said memory during successive periods, where each period corresponds to the period of said square-wave signal, said second means also including a bistable circuit, coupled to said memory, for translating the received series of signals into a two-level output signal having first and second levels corresponding respectively to the first and second levels of said square-wave signal, means for generating a reference signal having a constant amplitude, and electronic switching means for switching said reference signal to said third means in response to the second level of said two-level signal, the output signal of said switching means being said square-wave signal.

4. The circuit defined in claim 3 wherein said third means includes a filter circuit for translating said square-wave signal into the analog output signal, said filter circuit producing an output signal having an amplitude representing the average value of said square-wave signal.

5. The circuit defined in claim 1 wherein said second means includes a serial memory for receiving said series of signals, said series of signals being recirculated in said memory during successive periods, where each period corresponds to the period of said square-wave signal, said second means also including a bistable circuit, coupled to said memory, for translating the received series of signals into a two-level output signal having first and second levels constituting respectively the first and second levels of said square-wave signal; and wherein said third means includes a filter circuit directly responsive to said two-level output signal for producing the analog output signal as a function of the average value of said two-level output signal.

6. A converter for translating an applied set of digital signals into an analog output signal, said converter comprising: first means responsive to the applied set of signals for producing a series of first output signals, the number of said first output signals representing the digital signal set, said first means including a counter for receiving signals representing the set of digital signals, a matrix for producing a count-state signal indicating a predetermined count, and a count control circuit, responsive to said count-state signal, for actuating the counter to count until said predetermined count, said count control circuit producing said series of first output signals; a serial memory section for producing second output signals corresponding to said first output signals, said second output signals being recirculated in said memory section during successive periods, where each period corresponds to the time of duration of a signal series representing a maximum digital signal set; a bistable circuit, coupled to said memory section, for translating said second output signals into a two-level third output signal having a first level after the reception of the first of said second output signals and having a second level after the reception of the last of said second output signals; and output means for producing a fourth output signal having an amplitude representing the average level of said third output signal and constituting the analog output signal.

7. A digital-to-analog converter for translating, during an interval represented by an applied conversion-interval signal, an applied set of digital signals to a corresponding analog output signal, said converter comprising: counting means; count recognition means for producing a recognition signal indicating a predetermined count-state of said counting means; means for entering signals representing the digital signals into said counting means; count control means, responsive to said recognition signal and to the conversion-interval signal for actuating said counting means to count during the conversion interval until the occurrence of said recognition signal, said count control means producing a series of output signals, the number of signals of said series representing the applied set of digital signals; signal generating means, coupled to said count control means, for producing a two-level signal having a period corresponding to the time of duration of a signal series representing the maximum digital signal set, said two-level signal having a first level during the interval that said signal generating means receives said series of output signals and a second level for the duration of the period; and output means responsive to said two-level signal for producing the analog output signal as a function of the duration of the first level in said two-level signal during said period.

8. The converter defined in claim 7 wherein said counting means produces complementary pairs $C^1, \bar{C}^1; C^2, \bar{C}^2; \ldots C^n, \bar{C}^n$, representing the count-state of said counting means; and wherein said count recognition means produces a recognition signal R having a 1-representing level when said counting means assumes a maximum count-state where all of signals $C^1, C^2, \ldots C^n$ have 1-representing values, signal R being definable by the function:

$$R = C^1.C^2 \ldots C^n$$

where the dot (.) represents the logical "and"; the complement of recognition signal R being defined by the function:

$$\bar{R} = \bar{C}^1 + \bar{C}^2 + \ldots \bar{C}^n$$

where the plus (+) represents the logical "or."

9. The converter defined in claim 8 wherein said count control means includes a flip-flop P having input circuits 1P and 0P for receiving 1 and 0 setting signals, respectively, said flip-flop producing output signals P and $\bar{P}$ indicating when flip-flop P is in 1 and 0 states, respectivetively; flip-flop P being set to 1 when signal $\bar{R}$ is equal to 1 at the beginning of said conversion-interval as indicated by timing signal $t^o$, providing the input function:

$$1P = t^o.\bar{R}$$

and flip-flop P being set to 0 in response to signal R and a count pulse $Cp$ as defined by the function:

$$0P = R.Cp$$

10. The converter defined in claim 9 wherein said signal generating means includes a flip-flop F having input circuits 1F and 0F, flip-flop F being set to 1 upon the receipt of the first signal of said series, representable as one of a series of 1-representing signals $0^m$, and being reset to 0 upon the receipt of a 0-representing signal $\bar{0}^m$ indicating the end of said series, the input functions for circuits 1F and 0F being defined as:

$$1F = 0^m.Cp$$
$$0F = \bar{0}^m.Cp$$

11. An electronic conversion system for forming a plurality of analog output signals corresponding respectively to a plurality of sets of digital input signals selectively applied during different conversion sampling intervals, said system comprising: first means for receiving said sets of digital input signals during corresponding sampling intervals and producing a plurality of series of first output signals, one for each set of signals, the number of said first output signals in each series representing the corresponding digital set; second means responsive to said series of signals, for producing a plurality of square-wave signals, one for each series of signals, each square-wave signal having a period corresponding to the time of application of a number of signals representing the maximum digital set which may be converted, each of said second means including a plurality of means, one for each series, responsive to the first signal in the corresponding series for changing said square-wave signal from a first level to a second level and a plurality of means, one for each series, responsive to the last signal in the corresponding series for changing said square-wave signal from said second level to said first level; and third means responsive to said square-wave signals, respectively, for producing output signals having amplitudes representing the duration of the first level in the corresponding square-wave signal during said period, said output signals constituting the analog output signals, respectively.

12. The system defined in claim 11 wherein said second means includes a series of serial memory sections A . . . N, and a memory input matrix for entering corresponding series of signals into said sections A . . . N during respective sampling intervals represented by sampling signals $Sa \ldots Sn$; said second means also including flip-flops $Fa \ldots Fn$, respectively, for producing two level output signals representing the corresponding square-wave signal.

13. The system defined in claim 12 wherein said second means further includes N reference signal generators associated with said N memory sections, respectively, and N electronic switches coupled to said generators, respectively, for passing corresponding reference signals in response to one level of a corresponding flip-flop signal; and wherein said third means includes N low-pass filter circuits for producing the analog output signals, respectively.

14. The system defined in claim 11 wherein said second means includes a serial memory section for receiving said plurality of series of said first output signals, the series of first output signals being entered into said memory section during specified time intervals indicated by memory entry series $M_1 \ldots M_n$; said second means also includes a plurality of flip-flop circuits, one for each of said series of first output signals, and an output matrix for setting each flip-flop to a 1-representing state at the beginning of the corresponding series and for setting the corresponding flip-flop to a 0-representing state at the end of the corresponding series; and wherein said third means includes a plurality of low-pass filter circuits directly responsive to signals produced by said flip-flop for producing corresponding analog output signals.

15. A digital-to-analog converter responsive to a coded set of digital input signals representing a number to produce an analog output voltage having amplitude proportional to the value of the number, said converter comprising: a counter having a predetermined capacity, to store signals representing numbers having a predetermined maximum value; means for transferring the set of input signals into said counter; first means coupled to said counter for producing, in response to said set of input signals, a pulse series including a quantity of pulses equal to the value of the number represented by said set of input signals; serial circulating memory means having a predetermined pulse capacity related to the predetermined capacity of said counter; second means coupled to said first means and to said memory means for transferring said pulse series into said memory means; third means coupled to said memory means and responsive to said pulse series for producing a square wave signal normally having a quiescent level, and having, in response to said pulse series, an active level during a portion of a fixed time period which bears the same ratio to said fixed time period as said number bears to the predetermined maximum value thereof; and integrator means coupled to said third means and responsive to the active level of said square wave signal for producing, during successive time periods, the analog output voltage.

16. In combination, a counter, means coupled to the counter for introducing to the counter a plurality of input signals digitally representing a particular quantity to set the counter to a digital value dependent upon the input signals, means coupled to the counter for providing a plurality of intermittent signals and for introducing the intermittent signals to the counter to change the setting of the counter in accordance with the pattern of the intermittent signals, means including count recognition matrix means and a count control circuit coupled to the counter for passing the intermittent signals to the counter until the occurrence of a particular count in the counter, and means including a signal generator constructed to produce an output signal of particular characteristics and coupled to the last mentioned means and including a stage coupled to the signal generator for producing an output signal having an amplitude substantially proportional to the number of intermittent signals passed by the last mentioned means.

17. In combination, a counter, means coupled to the counter for introducing to the counter a plurality of input signals digitally representing a particular quantity to set the counter to a digital value dependent upon the input signals, means coupled to the counter for providing a plurality of intermittent signals and for introducing the intermittent signals to the counter to produce a count of the signals from the value initially set into the counter, means including count recognition matrix means coupled to the counter for interrupting the count of signals in the counter upon the occurrence of a particular value in the counter, means including a count control circuit coupled to the count recognition matrix means for producing a signal having a particular amplitude upon the introduction of the input signals to the counter and until the occurrence of the particular value in the counter, and means including switching means coupled to the count control circuit for activation during the production of the signal of particular amplitude by the count control circuit and including a generator of a signal of particular characteristics and coupled to the switching means during the activation of the switching means to produce an output signal having an amplitude related to the digital information represented by the input signals.

18. In combination, a counter, means coupled to the counter for introducing to the counter a plurality of input signals digitally representing a particular quantity to set the counter to a digital value dependent upon the input signals, a control circuit coupled to the counter for producing intermittent signals and for introducing the intermittent signals to the counter to vary the indications in the counter from the initial setting of the counter, matrix means associated with the counter for producing a control signal upon the variance of the indications in the counter to a particular setting in the matrix means, a count control circuit initially triggered to a first state of operation by the intermittent signals from the control circuit and subsequently triggered to a second state of operation by the control signal from the matrix means, means including the count control circuit for producing a signal having a particular amplitude during the production of the first state of operation in the count control circuit, and means including a source of substantially constant current responsive to the signal of particular amplitude obtained from the last mentioned means for producing an output voltage having an amplitude related to the duration of the signal of particular amplitude.

19. In combination, a counter, means coupled to the counter for providing a plurality of input signals digitally representing a particular quantity and for setting the counter to a value representing the digital information, means coupled to the counter for providing a plurality of intermittent signals and for introducing the signals to the counter to produce a count of the intermittent signals, means coupled to the counter for interrupting the count of the intermittent signals upon the occurrence of a particular count in the counter, matrix means associated with the last mentioned means to pass the intermittent signals until the interruption of the count in the counter, means coupled to the matrix means for providing a memory of the intermittent signals passed by the matrix means and for presenting the signals on a recirculatory basis, bistable means coupled to the last mentioned means for providing a first signal during the recirculation of the signals by the last mentioned means and for providing a second signal at other times, and means operatively coupled to the bistable means during the production of the first signal in the bistable means for providing a voltage having an amplitude proportional to the time during which the bistable means operates in its first state.

20. In combination, means for providing a plurality of signals representing the value of an input quantity in digital form, means responsive to the digital signals for converting the digital signals into a plurality of periodic signals directly related to the value of the quantity, means coupled to the last mentioned means for producing a control signal having a first amplitude during the occurrence of the periodic signals and having a second amplitude after the occurrence of the periodic signals, means for providing an output voltage having an amplitude related to the duration and amplitude of the current flow through it, and means responsive to the control signal from the control signal means and coupled to the output voltage means and including switching means and a source of current having a constant amplitude for producing a flow of current through the output means during the production of the first amplitude in the control signal to obtain the production of an output voltage directly related to the value of the input quantity.

21. In combination, means for providing a plurality of signals representing the value of an input quantity in digital form, means responsive to the digital signals for converting the digital signals into a number of periodic signals directly related to the value of the quantity, means including a bistable member coupled to the converting means for producing a signal having a first amplitude during the occurrence of the periodic signals and for producing a signal having a second amplitude at other times, a filter for providing an output voltage related to the duration of the flow of current through it, means including switching means responsive to the signal from the bistable member and operative upon the filter for providing a flow of current through the filter only during the occurrence of the first amplitude in the signal from the bistable member to obtain the production by the filter of a voltage having an amplitude related to the value of the input quantity.

22. In combination, a counter, means coupled to the counter for introducing to the counter a plurality of input signals digitally representing an input quantity to set the counter to a digital value dependent upon the input signals, means coupled to the counter for providing a plurality of intermittent signals and for introducing the intermittent signals to the counter to produce a count of the signals from the value initially set into the counter, means including matrix means coupled to the counter for interrupting the count of the signals in the counter upon the occurrence of a particular count in the counter, a plurality of switching means, a plurality of channel means each including a different switching means in the plurality and each coupled to the counter for producing a signal having a particular amplitude during the operation of the counter in counting the intermittent signals, a plurality of output stages each coupled to a different one of the switching means in the plurality for producing an output voltage having an amplitude related to the duration of the particular amplitude in the associated channel means, and a memory matrix coupled to the channel means for selectively activating the different channel means at successive instants of time to obtain the production of the output voltages from the output stages associated with the channel means.

23. In combination, a counter, means coupled to the counter for providing a plurality of input signals digitally representing an input quantity and for setting the counter to a value representing the digital quantity, means coupled to the counter for providing a plurality of intermittent signals and for introducing the signals to the counter to produce a count of the intermittent signals, means including matrix means electrically coupled to the counter for interrupting the count of the intermittent signals upon the occurrence of a particular count in the counter, a count control circuit electrically coupled to the matrix means and the intermittent signal means for producing a signal having first characteristics during the count of the intermittent signal in the counter and having second characteristics at other times, a plurality of circuit means coupled to the count control circuit for providing a signal having a substantially constant amplitude during the production of the signal having first characteristics by the count control circuit, a plurality of low pass filters each electrically coupled to a different one of the circuit means in the plurality for producing a signal having an amplitude directly related to the duration of the signal of constant amplitude from the associated circuit means, and a memory matrix coupled to the count control circuit for controlling the introduction of the signals of first characteristics from the count control circuit to a particular one of the circuit means at any instant for the production by the associated low pass filter of an output voltage having an amplitude related to the value of the input quantity.

24. In combination, means for providing a plurality of signals digitally representing the value of an input quantity in digital form, means responsive to the digital signals for converting the digital signals into a number of periodic signals directly related to the value of the quantity, means coupled to the last mentioned means for producing a control signal having a first amplitude during the occurrence of the periodic signals and having a second amplitude after the occurrence of the periodic signals, a plurality of output means each operative to produce an output voltage having an amplitude directly related to the duration and amplitude of the current flow through it, a plurality of switching means each operatively coupled upon activation to a different one of the output means at particular times to obtain an activation of the output means, a memory matrix coupled to the switching means in the plurality for selectively controlling the activation of the different switching means in the plurality on an individual basis, and a source responsive to the control signal and operative upon the output means associated with the activated switching means for providing a flow of a substantially constant current through the output means coupled to the activated switching means during the activation of the switching means and during the production of the first amplitude in the control signal to obtain at any instant in the activated output means an output voltage directly related to the value of the input quantity.

25. The combination set forth in claim 23 in which a plurality of stages are coupled to the count control circuit for providing for the recirculation of the intermittent signals during the production of the first amplitude in the control signal and in which each of these stages is electrically coupled to a different one of the circuit means to obtain the passage of signals to the associated low pass filter on a recirculatory basis upon the activation of the stage and the associated circuit means by the memory matrix.

26. The combination set forth in claim 23 in which a single stage is coupled to the count control circuit for providing for the recirculation of the intermittent signals during the production of the first amplitude in the control signal and in which the signals recirculated by the stage are introduced to the different circuit means at successive instants of time in accordance with the operation of the memory matrix for the production of the signals of substantially constant amplitude in the circuit means.

References Cited in the file of this patent

UNITED STATES PATENTS

| | | |
|---|---|---|
| 2,607,006 | Hoeppner | Aug. 12, 1952 |
| 2,686,008 | Davidon | Aug. 10, 1954 |
| 2,700,750 | Dickinson | Jan. 25, 1955 |
| 2,705,901 | Sherwin | Apr. 12, 1955 |

UNITED STATES PATENT OFFICE

Certificate of Correction

Patent No. 2,916,209 December 8, 1959

Phil A. Adamson et al.

It is hereby certified that error appears in the printed specification of the above numbered patent requiring correction and that the said Letters Patent should read as corrected below.

Column 9, lines 18 to 20, the equation should appear as shown below instead of as in the patent:

$$(500r)\ R=C^1.C^2\ .\ .\ .\ C^n$$
$$(500\bar{r})\ \bar{R}=\bar{C}^1+\bar{C}^2+\ .\ .\ .\ \bar{C}^n$$

Signed and sealed this 7th day of June 1960.

[SEAL]

Attest:
KARL H. AXLINE,
*Attesting Officer.*

ROBERT C. WATSON,
*Commissioner of Patents.*